United States Patent
Scherman et al.

(10) Patent No.: US 10,404,738 B2
(45) Date of Patent: Sep. 3, 2019

(54) IPFIX-BASED DETECTION OF AMPLIFICATION ATTACKS ON DATABASES

(71) Applicant: Microsoft Technology Licensing, LLC, Redmond, WA (US)

(72) Inventors: Mathias Scherman, Tel-Aviv (IL); Tomer Teller, Tel-Aviv (IL); Hanan Shteingart, Tel-Aviv (IL); Royi Ronen, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 15/444,110

(22) Filed: Feb. 27, 2017

(65) Prior Publication Data

US 2018/0248906 A1    Aug. 30, 2018

(51) Int. Cl.
*H04L 29/06*  (2006.01)
*G06N 20/00*  (2019.01)
*H04L 29/12*  (2006.01)

(52) U.S. Cl.
CPC ......... *H04L 63/1441* (2013.01); *G06N 20/00* (2019.01); *H04L 63/0245* (2013.01);
(Continued)

(58) Field of Classification Search
CPC ............. H04L 63/1441; H04L 63/1425; H04L 63/1416; H04L 63/145
See application file for complete search history.

(56) References Cited

U.S. PATENT DOCUMENTS

| 8,682,812 B1 | 3/2014 | Ranjan |
| 2010/0138919 A1 | 6/2010 | Peng et al. |
| 2016/0065620 A1* | 3/2016 | Liu ............ H04L 63/1441 726/1 |

FOREIGN PATENT DOCUMENTS

WO    2010076832 A1    7/2010

OTHER PUBLICATIONS

Meitei, et al., "Detection of DDoS DNS Amplification Attack Using Classification Algorithm", In Proceedings of the International Conference on Informatics and Analytics, 6 pages.
(Continued)

*Primary Examiner* — Dao Q Ho
(74) *Attorney, Agent, or Firm* — Workman Nydegger

(57) ABSTRACT

One embodiment illustrated herein includes a computer implemented method. The method includes acts for training an amplification attack detection system. The method includes obtaining a plurality of samples of IPFIX data. The method further includes using the IPFIX data to create a plurality of time-based, server samples on a per server basis such that each sample corresponds to a server and a period of time over which IPFIX data in the sample corresponds. The method further includes identifying a plurality of the server samples that are labeled positive for amplification attacks. The method further includes identifying a plurality of server samples that are labeled negative for amplification attacks. The method further includes automatically labeling at least some of the remaining server samples as positive or negative based on the previously identified labeled samples. The method further includes using the automatically labeled samples to train an amplification attack detection system.

20 Claims, 4 Drawing Sheets

(52) U.S. Cl.
CPC ...... *H04L 63/1425* (2013.01); *H04L 63/1458* (2013.01); *H04L 61/1511* (2013.01)

(56) References Cited

OTHER PUBLICATIONS

Miao, et al., "The Dark Menace: Characterizing Network-based Attacks in the Cloud", In Proceedings of the ACM Conference on Internet Measurement Conference, Oct. 28, 2015, 14 pages.
Peter, "DNS amplification attacks", http://blog.sflow.com/2013/10/dns-amplification-attacks.html, Published on: Oct. 16, 2013, 5 pages.
Huistra, David, "Detecting Reflection Attacks in DNS Flows", In Proceedings of 19th Twente Student Conference on IT, Jun. 24, 2013, 8 pages.
Ismail, et al., "An Overview of DNS Amplification Attack Defense via Flow-Based Analysis and SDN", In Australian Journal of Basic and applied Sciences, vol. 10, Issue 11, May 26, 2016, 6 pages.
Gao, et al., "A Machine Learning Based Approach for Detecting DRDoS Attacks and Its Performance Evaluation", In Proceedings of 11th Asia Joint Conference on Information Security, Aug. 4, 2016, 7 pages.
McElhany, Anna, "Detecting DDoS with Netflow", https://www.plixer.com/blog/general/detecting-ddos-with-netflow/, Published on: May 8, 2015, 5 pages.
Satam, et al., "Anomaly Behavior Analysis of DNS Protocol", In Journal of Internet Services and Information Security, vol. 5, No. 4, Nov. 2015, pp. 85-97.
Yusof, et al., "An evaluation on KNN-SVM algorithm for detection and prediction of DDoS attack", In Proceedings of 29th International Conference on Industrial Engineering and Other Applications of Applied Intelligent Systems, Aug. 2, 2016, 3 pages.
Rastegari, et al., "Defending Denial of Service Attacks against Domain Name System with Machine Learning Techniques", In International Journal of Computer Science, vol. 37, No. 4, Nov. 23, 2010, 6 pages.
Khan, et al., "A Chaotic Measure for Cognitive Machine Classification of Distributed Denial of Service Attacks?", In Proceedings of 13th International Conference on Cognitive Informatics and Cognitive Computing, Aug. 18, 2014, pp. 100-108.
"International Search Report and Written Opinion Issued in PCT Application No. PCT/US18/018653", dated May 4, 2018, 15 Pages.

\* cited by examiner

1. Train a logistic regression model using the labeled instance set L — 401
2. Make predictions over the unlabeled instances (instances not in L) — 402
3. Predictions with confidence score over predefined threshold α are added to L — 403

IPFIX-BASED DETECTION OF AMPLIFICATION ATTACKS ON DATABASES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

To access resources on the Internet, a system needs to know the location of a server having the information. This location information can be provided by domain name servers. The Domain Name System (DNS) is a naming system for resources connected to the Internet. It serves as "phone book" for the Internet by translating human-friendly computer hostnames into IP addresses. In particular, a client wishing to know the location of a server with desired information will send a DNS request to a DNS resolver to request the appropriate IP address. In particular, the client will typically provide the DNS resolver with a domain name, such as www.contoso.com, and the DNS resolver will respond with the IP address, e.g., 52.178.167.109, of the server corresponding to that domain name. The client can then follow the provided IP address to reach the server and access the desired information.

Often times, a domain name will correspond to multiple IF addresses due to a service being mirrored in diverse geographic locations. For example, a company may have servers in different regions of the world having the same information where a client can choose which of the servers to access to obtain the information based on the clients physical (and typically logical) proximity to servers. Thus, if a client wishes to select from multiple servers, the client will request that IP addresses be provided for multiple servers. The DNS response message protocol defines a txt field which can store up to 4,000 bytes of information. The DNS resolver may use this txt field to provide IP addresses for a number of different server locations, which resolve to the domain name in the request from the client.

Nefarious individuals may use this functionality of the DNS system to perform a so called Denial of Service (DoS) attack whereby large amounts of data are sent to a victim machine to occupy the machine with handling received data and thus the machine will not be able to perform legitimate work. In particular, DNS amplification attacks are a popular form of DoS attacks, in which an attacker utilizes the resources and bandwidth of a DNS resolver to amplify an attack against a target victim machine. DNS resolvers that are open to the world are especially susceptible to be used by attackers in this type of attack. This is done by sending a request to resolve a domain name to a DNS resolver and requesting multiple server locations in response; but where the request is used by spoofing the IP address of an intended victim. This results in an attacker being able to amplify their ability to attack the victim's system. In particular, an attacker machine can send a small message (e.g., about 64 bytes) requesting resolution of an IP address and requesting that the resolution provide all available servers to a machine at the victim's IP address. This will result in a comparatively large message (e.g., 3876 bytes representing an amplification factor of about 60) being sent to the victim as a result of the DNS service responding to the spoofed address of the victim.

Thus, it would be useful to identify DNS simplification attacks. This information could be used to attempt to identify entities that are effecting the attacks. Alternatively or additionally, this information can be used to attempt to thwart such attacks. Or for other purposes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method. The method includes acts for training an amplification attack detection system. The method includes obtaining a plurality of samples of IPFIX data. The method further includes using the IPFIX data to create a plurality of time-based, server samples on a per server basis such that each sample corresponds to a server and a period of time over which IPFIX data in the sample corresponds. The method further includes identifying a plurality of the server samples that are labeled positive for amplification attacks. The method further includes identifying a plurality of server samples that are labeled negative for amplification attacks. The method further includes automatically labeling at least some of the remaining server samples as positive or negative based on the previously identified labeled samples. The method further includes using the automatically labeled samples to train an amplification attack detection system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein can be used to detect DNS amplification attacks on DNS resolvers, or indeed other amplification attacks using other technologies, with access only to low-level IPFIX data. Often, in cloud environments, this may be the only type of data available for analysis, as access to the actual payload data in data packets is not generally available, and in many situations, may be restricted from this type of access.

For machine learning purposes, high quality labels for these attacks are hard to identify, making it very hard to create machine learning based detection models. Thus, traditional approaches are rule-based, but they raise a lot of false positives. Simple rule based approaches are bound to be suboptimal as they often rely on static threshold which can easily be avoided by knowledgeable attackers. Machine learning is quickly replacing these methods in the security domain. However, as most of the data is unlabeled, techniques often rely on anomaly detection. Thus, such methods produce many false positives since many anomalies are not the result of a security incident.

In contrast, embodiments illustrated herein use a variety of methods to generate, propagate and assign labels, based on a relatively small number of previously identified labels used as a seed basis to identify additional labels. To do so, embodiments leverage threat intelligence alerts, and train semi-supervised machine learning models over sampled network metadata. In particular, some embodiments use Netflow/IPFIX data. That is, embodiments may use a semi-supervised learning approach which enables a system to effectively train a model with a small number of labels as input. Details are now illustrated.

Figure 1:
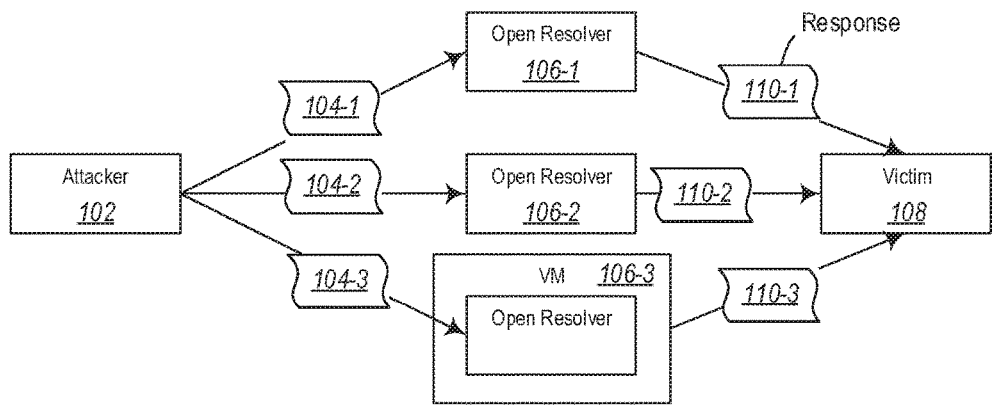
FIG. 1 illustrates an example of a DNS amplification attack scenario.

FIG. 1 illustrates an example DNS amplification attack scenario. In particular an attacker 102 sends spoofed requests 104-1, 104-2, and 104-3 to a plurality of different resolvers such as the resolvers 106-1 106-2 and 106-3. Although in the illustrated example only three requests and three resolvers are illustrated, it should be appreciated that the attacker 102 will likely send the spoofed requests to a large number of resolvers, such as for example in the tens of thousands or hundreds of thousands of resolvers. In particular, the attacker 102 is attempting to amplify its own network traffic into a much larger amount of network traffic directed at a victim 108.

The spoofed requests, referred to generally as 104 (but shown specifically in FIG. 1 as 104-1, 104-2 and 104-3) include a request to resolve a domain name to a plurality of different server addresses. The request 104 includes a spoof of the IP address of the victim 108 such that the resolvers 106 treat the request 104 as if it came from the victim 108. This will result in the resolvers 106 sending responses 110-1, 110-2, and 110-3 (note that a much larger number of responses will be provided to the victim 108) to the requests 104-1, 104-2, and 104-3 to the victim 108. As illustrated in the example in FIG. 1, the spoofed requests may be about 64 bytes in size. However, each of the responses 110 may be as large as 4000 bytes in size. Thus, for each spoofed request 104 sent to a resolver 106, the spoofed request 104 can be amplified by about a factor of 60.

Figure 2:
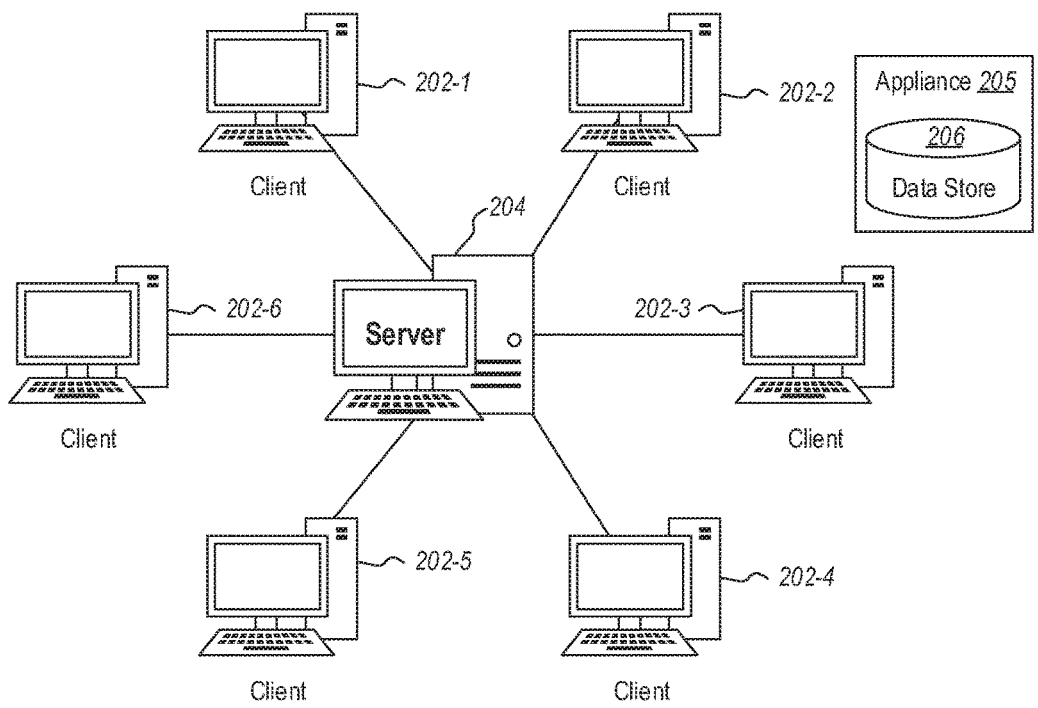
FIG. 2 illustrates clients coupled to a server and an appliance for collecting information from requests sent by the clients to the server.

Referring now to FIG. 2, a plurality of clients 202-1 through 202-6 are coupled to a server 204. Each of the clients 202 can send DNS requests to the server 204, which may be for example a resolver, such as one of the resolvers 106 illustrated in FIG. 1. Alternatively or additionally, the server 204 may be able to provide requests from the client to resolvers such as the resolvers 106 illustrated in FIG. 1.

An appliance 205 in a network environment may include a data store 206. The appliance 205 can collect information from the requests sent by the clients 202. In particular, the appliance 205 will collect and store in the data store 206 sampled IPFIX/Netflow data.

The data store 206 may be for example part of a big data environment such as those provided by Hadoop® available from the Apache™ Software Foundation or Data Lake® available from Microsoft® Corporation of Redmond Wash. In particular, IPFIX/Netflow data contains a modest amount of information about data packets flowing in a network. For example, an individual IPFIX record may include a source IP address, one or more destination IP addresses, a port and an indicator of a number of packets. However, the IPFIX data will typically exclude other information from network requests and messages. Thus, the data is a minimal set of data with a limited amount of information.

Note that in some embodiments, the IPFIX data is sampled and collected rather than collecting all IPFIX data. For example, in some embodiments, approximately one out of every 40 messages has IPFIX data collected for the messages. Note also that in some embodiments samples are taken on a per server, per time period basis. Thus, for example, a given sample may include IPFIX data for requests and responses to and from a particular server over a given period of time, such as 1 ms, 1 second, 1 minute, 1 hour, 1 day, 1 week, or other period of time. Thus, a sample will include, far example, an hour's worth of IPFIX data for a particular server.

Large amounts of this IPFIX data is sampled into such samples stored over a long period of time. For example, in some embodiments, IPFIX data may be sampled for a period of three months and stored in the data store 206.

Note that in some embodiments, the stored IPFIX data may be filtered prior to (or even after) sampling according to certain desirable properties. For example, in one embodiment, the data is filtered such that communications that happen on a DNS port are included in the data stored on the data store 206 while other data is excluded from the data stored on the data store 206.

Once a sufficient amount of data has been collected at the data store 206, where sufficient may be determined by data collected for a period of time, a certain quantity of data, or some other metric to determine the amount of data that will be used, the data is analyzed and metrics are extracted for the data. For example, for each sample of IPFIX sampled data, various metrics may be extracted. The metrics may be classified based on whether they related to messages from the or messages from clients.

In particular, for server messages and each appropriate IPFIX sample, number of packets in data may be determined. Additionally or alternatively, embodiments may generate metrics indicating a ratio of the Internet protocols (e.g. TCP vs. UDP). Additionally or alternatively, embodiments may generate metrics indicating incoming and outgoing packet sizes. Additionally or alternatively, metrics regarding the number of distinct clients that a server communicates with for a given message may be extracted. Additionally or alternatively, embodiments may generate metrics indicating mean and standard deviation of packet size to servers. Additionally or alternatively, embodiments may generate metrics indicating mean and standard deviation of packet sizes from servers.

With respect to client features, embodiments may aggregate client servers for a server by averaging the number of packets that are communicating between the clients and their correspondents. Additionally or alternatively, embodiments may generate metrics indicating a ratio of the Internet protocols (e.g. TCP vs. UDP) from clients. Additionally or alternatively, embodiments may generate metrics indicating mean packet size from clients of the server. Additionally, or alternatively, embodiments may generate metrics indicating mean packet sizes to clients. Additionally or alternatively, embodiments may generate metrics indicating the mean number of distinct servers that a client have been communicating with.

Once these metrics have been extracted, embodiments can identify a limited set of seed labels which will later be used to label other samples in the data stored on the data store 206. In particular, embodiments may identify a limited number of labels that identify positive samples and a limited number of labels that identify negative samples. For example, positive samples are samples that include data where the samples correspond to a DNS amplification attack. Negative samples indicate that activities associated with those samples exhibit normal behavior that is likely not associated with a DNS amplification attack.

In some embodiments, positive samples may be identified by a network administrator manually identifying and labeling the positive samples. Alternatively or additionally, protection systems such as Azure® Safeguard may be used to identify positive samples. For example, a limited number of samples may be applied to the protection system which can identify positive samples.

Many negative samples can be more easily identified by using automated processes. For example, some embodiments may use an automated process to filter based on incoming to outgoing packet size ratios. Alternatively or additionally, embodiments may be configured to filter based on number of clients indicated in a sample. For example, a sample that has a packet size ratio of incoming packet size to outgoing packet size of 1 to 1 is almost certainly not a DNS amplification attack because no amplification of incoming requests is performed with respect to outgoing responses.

Similarly, if a sample indicates that only a single client was served, then this sample can also be identified and labeled as a negative sample, as a positive sample would require at least two clients, an attacker sending a request, and a victim receiving the response. Thus, using these (or other) automated processes, various negative samples may be identified. Note that while automated processes are illustrated herein for identifying the negative samples, it should be appreciated that in other embodiments, manual processes can alternatively or additionally be used to identify negative labels for samples as well.

Figure 3:
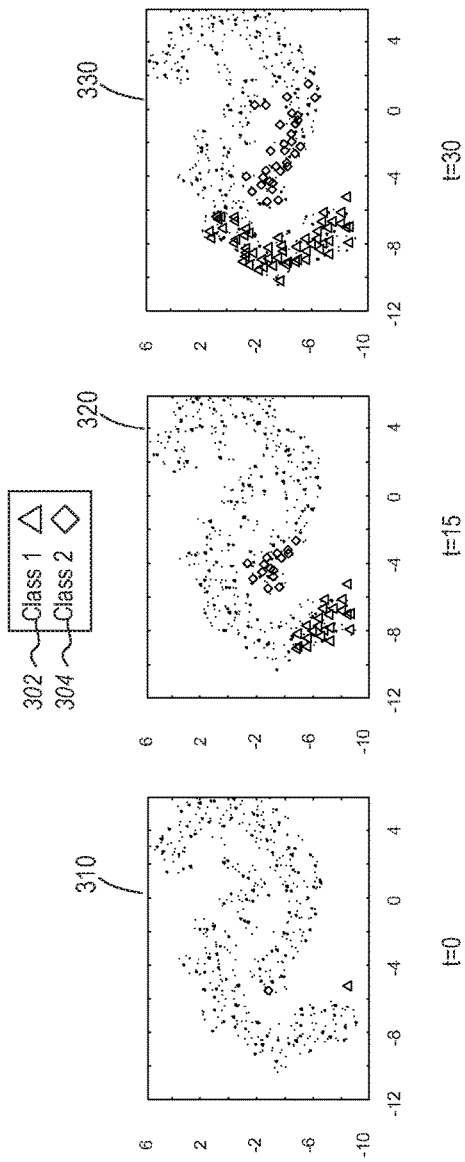
FIG. 3 illustrates a graphical example of iterative assignment of IPFIX samples to positive and negative indicator classes.

Referring now to FIG. 3, a graphical example of label propagation is illustrated. In particular, two classes of labels are used as seed classes. In particular, the positive labels illustrated as class one 302 and negative labels illustrated as class two 304 are shown. In the example illustrated in FIG. 3 at time zero the seed corpus 306 of positive labels is illustrated and a seed corpus 308 of negative labels is illustrated. The first frame 310 further illustrates the various other samples collected and stored in the data store 206. The other samples are illustrated as unclassified and unlabeled. Various algorithms can be used to attempt to label the unlabeled samples. For example, various regression algorithms, such as logistic regression, support vector machine (SVM), random forest, etc., can be used to attempt to identify labels for the unlabeled samples using the seed corpuses 306 and 308. In particular, a regression algorithm may be performed to attempt to identify similarities between unlabeled samples and the labeled samples of class one 302 and class two 304. A given sample will only be labeled if it is within some confidence level of being in a particular class.

Figure 4:
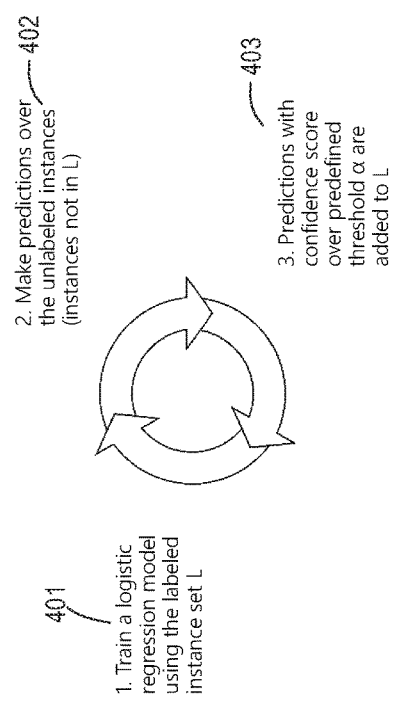
FIG. 4 illustrates a recursive training scenario for classifying samples.

Label propagation may be done in an iterative process as illustrated in FIGS. 3 and 4. In particular, labels may be identified for samples within a particular confidence level and then those samples are added to the corpus for a particular class, such as the classes 302 and 304. This updated corpus can then be used in another regression analysis to identify still further samples that belong to a particular class and should be labeled as belonging to the class.

As illustrated in FIG. 4, this can be done iteratively by first training a logistical regression model using the original labeled instance at L as illustrated at 402. Predictions are made over unlabeled instances of the samples (that is, an instance is not in L) as illustrated at 402. Predictions with a confidence score over a predefined threshold α are added to L as illustrated at 403. The threshold α may be selected using a cross-validation.

This process is repeated iteratively until no new additional labels can be assigned to unlabeled samples.

Once label propagation is complete, the instance set L can be used by a machine learning tool to create a model for identifying DNS, or other, amplification attacks. This model can then be deployed to the servers such as server 204. The servers can then use this model with a protection system to identify when requests from clients 202 are likely part of DNS amplification attacks. The server 204 can then block requests that appear to be part of a DNS amplification attack, effectively thwarting the DNS amplification attack. Some embodiments may implement an improved system both in several aspects. The server 204 may be improved by being able to allocate more resources to legitimate DNS traffic rather than having the attack traffic unnecessarily use server resources. Alternatively or additionally, DNS servers being used in such attacks consume a lot of resources which represent real monetary costs. By blocking such attacks, cloud providers can reduce monetary costs.

Figure 5:
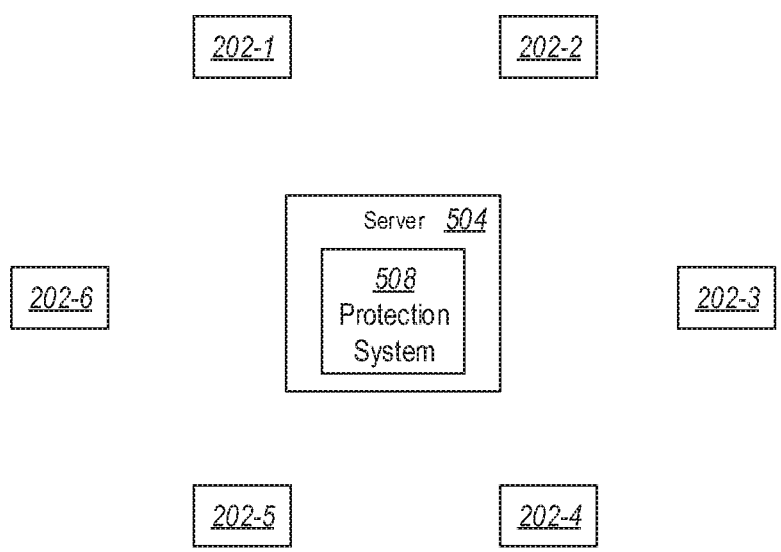
FIG. 5 illustrates a server protection system.

For example, reference is now made to FIG. 5 which illustrates an improved server 504 accessible by clients 202-1 through 202-6. The server 504 includes a protection system 508 configured to identify request traffic from the clients 202-1 through 202-6 to attempt to identify requests, such as DNS requests, that appear to be part of a DNS amplification attack. The protection system 508 can intercept and suppress such requests to prevent DNS amplification attacks.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
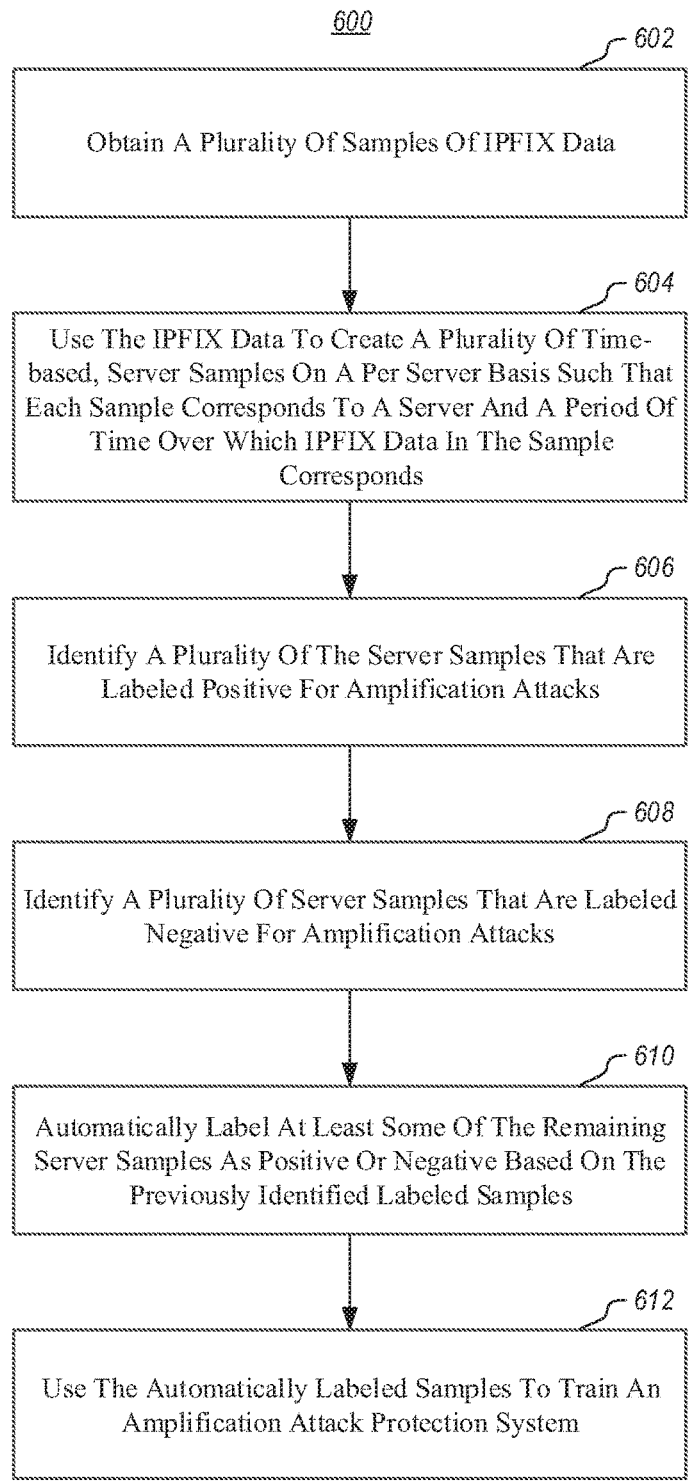
FIG. 6 illustrates a method of training an amplification attack detection system.

Referring now to FIG. 6, a method 600 is illustrated. The method 600 includes acts for training an amplification attack detection system. The method includes obtaining a plurality of samples of IPFIX data (act 602). For example, IPFIX data may be collected over a period of time for a plurality of servers in a cloud system. Alternatively, IPFIX data may be collected over a period of time for a plurality of servers in an on-premises system. The data may be collected, for example, by one or more appliances such as the appliance 205. The data may be stored in a data store, such as for example, the data store 206.

The method 600 further includes using the IPFIX data to create a plurality of time-based, server samples on a per server basis such that each sample corresponds to a server and a period of time over which IPFIX data in the sample corresponds (act 604). That is, server samples are created where each of the samples corresponds to a particular server and corresponds to some time period for that server. The samples include IPFIX data for the server and for the period.

The method 600 further includes identifying a plurality of the server samples that are labeled positive for amplification attacks (act 606). Often, as noted above, this is done manually or using previously identified samples that were previously labeled as positive for amplification attacks.

The method 600 further includes identifying a plurality of server samples that are labeled negative for amplification attacks (act 608). Often, this can be done automatically, without user intervention. As described below, there are certain types of samples which can be eliminated based on predefined rules that would indicate that those samples are clearly not part of an amplification attack.

The method 600 further includes automatically labeling at least some of the remaining server samples as positive or negative based on the previously identified labeled samples (act 610). For example, as illustrated in FIGS. 3 and 4, samples that have been labeled can be used by a data analysis system to label other samples.

The method 600 further includes using the automatically labeled samples to train an amplification attack detection system (act 612). For example, as illustrated in FIG. 5, a protection system 506 can be trained by using the labeled samples.

The method 600 may be practiced where identifying a plurality of the server samples that are labeled positive for amplification attacks comprises manually labeling samples as positive for amplification attacks. Thus, for example, an administrator could identify samples that are known to be associated with an amplification attack and label those samples as positive for amplification attacks.

The method 600 may be practiced where identifying a plurality of server samples that are labeled negative for amplification attacks comprises applying automated rules to server samples to automatically label the server samples as negative for amplification attacks. For example, applying automated rules to server samples to automatically label the server samples as negative for amplification attacks may include comparing incoming to outgoing packet size ratios with respect to a server. In particular, a sample that has a packet size ratio of incoming packet size to outgoing packet size of 1 to 1 is almost certainly not a DNS amplification attack because no amplification of incoming requests is performed with respect to outgoing responses. In another example, applying automated rules to server samples to automatically label the server samples as negative for amplification attacks may include comparing a number of clients indicated in a sample. In particular, if a sample indicates that only a single client was served, then this sample can also be identified and labeled as a negative sample, as a positive sample would require at least two clients, an attacker sending a request, and a victim receiving the response. Thus, using these (or other) automated processes, various negative samples may be identified.

The method 600 may be practiced where automatically labeling at least some of the remaining server samples as positive or negative based on the previously identified labeled samples is performed iteratively. For example, FIGS. 3 and 4 illustrate iterative identification of samples, both positive and negative.

These embodiments of the method 600 may be practiced where automatically and iteratively labeling at least some of the remaining server samples as positive or negative based on the previously identified labeled samples is performed until a steady state is reached where no more samples can be classified automatically.

The method 600 may be practiced in an environment where the amplification attack detection system is configured to protect against DNS amplification attacks. However, in other embodiments, other types of amplification attacks may be any attack which allows the attacker to send a small request to a server resulting in a large response to a victim, where small and large in this context are relative to each other. For example, a large response may be one that is at least one order of magnitude larger than the small request. This may apply to a DDoS attack, using any protocol, such as internet control message protocol (ICMP) or user datagram protocol (UDP) amplification.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for protecting against amplification attacks, the system comprising:
   a data store;
   an appliance comprises one or more processors coupled to the data store, wherein the processors are configured to:
      collect a plurality of samples of IPFIX data;
      use the IPFIX data to create a plurality of time-based, server samples on a per server basis such that each server sample corresponds to a server and a period of time over which IPFIX data in the sample corresponds;
      identify a first plurality of the server samples that are labeled positive for amplification attacks indicating that the first plurality of the server samples are associated with amplification attacks;
      identify a second plurality of server samples that are labeled negative for amplification attacks indicating that the second plurality of the server samples are not associated with amplification attacks; and
      automatically label at least some of the remaining server samples as positive or negative based on the previously identified labeled samples, by using the previously identified labeled samples to predict, with confidence above a predetermined threshold, that the at least some of the remaining server samples should be labeled as positive or negative; and
   a protection system configured to use the automatically labeled samples, to identify, and protect against amplification attacks.

2. The system of claim 1, wherein the appliance is configured to identify a plurality of the server samples that are labeled positive for amplification attacks by identifying manually labeled samples.

3. The system of claim 1, wherein the appliance is configured to identify a plurality of server samples that are labeled negative for amplification attacks comprises applying automated rules to server samples to automatically label the server samples as negative for amplification attacks.

4. The system of claim 3, wherein the appliance is configured to apply automated rules to server samples to automatically label the server samples as negative for amplification attacks by comparing incoming to outgoing packet size ratios with respect to a server.

5. A system comprising:
one or more processors; and
one or more computer-readable media having stored thereon instructions that are executable by the one or more processors to configure the computer system to train an amplification attack detection system, including instructions that are executable to configure the computer system to perform at least the following:
obtain a plurality of samples of IPFIX data;
use the IPFIX data to create a plurality of time-based, server samples on a per server basis such that each server sample corresponds to a server and a period of time over which IPFIX data in the sample corresponds;
identify a first plurality of the server samples that are labeled positive for amplification attacks indicating that the first plurality of the server samples are associated with amplification attacks;
identify a second plurality of server samples that are labeled negative for amplification attacks indicating that the second plurality of the server samples are not associated with amplification attacks;
automatically label at least some of the remaining server samples as positive or negative based on the previously identified labeled samples, by using the previously identified labeled samples to predict, with confidence above a predetermined threshold, that the at least some of the remaining server samples should be labeled as positive or negative; and
use the automatically labeled samples to train an amplification attack detection system to protect against amplification attacks.

6. The system of claim 5, wherein the one or more computer-readable media have stored thereon instructions that are executable by the one or more processors to configure the computer system to identify a plurality of the server samples that are labeled positive for amplification attacks by manually labeling samples as positive for amplification attacks.

7. The system of claim 5, wherein the one or more computer-readable media have stored thereon instructions that are executable by the one or more processors to configure the computer system to identify a plurality of server samples that are labeled negative for amplification attacks by applying automated rules to server samples to automatically label the server samples as negative for amplification attacks.

8. The system of claim 7, wherein the one or more computer-readable media have stored thereon instructions that are executable by the one or more processors to configure the computer system to apply automated rules to server samples to automatically label the server samples as negative for amplification attacks by comparing incoming to outgoing packet size ratios with respect to a server.

9. The system of claim 7, wherein the one or more computer-readable media have stored thereon instructions that are executable by the one or more processors to configure the computer system to apply automated rules to server samples to automatically label the server samples as negative for amplification attacks by comparing a number of clients indicated in a sample.

10. The system of claim 5, wherein the one or more computer-readable media have stored thereon instructions that are executable by the one or more processors to configure the computer system to automatically label at least some of the remaining server samples as positive or negative based on the previously identified labeled samples iteratively.

11. The system of claim 10, wherein the one or more computer-readable media have stored thereon instructions that are executable by the one or more processors to configure the computer system automatically and iteratively label at least some of the remaining server samples as positive or negative based on the previously identified labeled samples until a steady state is reached where no more samples can be classified automatically.

12. The system of claim 5, wherein the one or more computer-readable media have stored thereon instructions that are executable by the one or more processors to configure the computer system train the amplification attack detection system to protect against DNS amplification attacks.

13. A method of training an amplification attack detection system, the method comprising:
obtaining a plurality of samples of IPFIX data;
using the IPFIX data to create a plurality of time-based, server samples on a per server basis such that each server sample corresponds to a server and a period of time over which IPFIX data in the sample corresponds;
identifying a first plurality of the server samples that are labeled positive for amplification attacks indicating that the first plurality of the server samples are associated with amplification attacks;
identifying a second plurality of server samples that are labeled negative for amplification attacks indicating that the second plurality of the server samples are not associated with amplification attacks;
automatically labeling at least some of the remaining server samples as positive or negative based on the previously identified labeled samples, by using the previously identified labeled samples to predict, with confidence above a predetermined threshold, that the at least some of the remaining server samples should be labeled as positive or negative; and
using the automatically labeled samples to train an amplification attack detection system to protect against amplification attacks.

14. The method of claim 13, wherein identifying a plurality of the server samples that are labeled positive for amplification attacks comprises manually labeling samples as positive for amplification attacks.

15. The method of claim 13, wherein identifying a plurality of server samples that are labeled negative for amplification attacks comprises applying automated rules to server samples to automatically label the server samples as negative for amplification attacks.

16. The method of claim 15, wherein applying automated rules to server samples to automatically label the server samples as negative for amplification attacks comprises comparing incoming to outgoing packet size ratios with respect to a server.

17. The method of claim 15, wherein applying automated rules to server samples to automatically label the server samples as negative for amplification attacks comprises comparing a number of clients indicated in a sample.

18. The method of claim 13, wherein automatically labeling at least some of the remaining server samples as positive or negative based on the previously identified labeled samples is performed iteratively.

19. The method of claim 18, wherein automatically and iteratively labeling at least some of the remaining server samples as positive or negative based on the previously identified labeled samples is performed until a steady state is reached where no more samples can be classified automatically.

20. The method of claim 13, wherein the amplification attack detection system is configured to protect against DNS amplification attacks.

* * * * *